United States Patent
Gardner et al.

[11] Patent Number: 6,024,259
[45] Date of Patent: Feb. 15, 2000

[54] IMPREGNATED CERAMIC RISER TUBE AND METHOD OF MANUFACTURING SAME

[75] Inventors: Matthew T. Gardner, Troy; David A. Larsen, Clifton Park, both of N.Y.

[73] Assignee: Blasch Precision Ceramics, Inc., Albany, N.Y.

[21] Appl. No.: 08/853,717

[22] Filed: May 9, 1997

[51] Int. Cl.[7] .................................................. B22D 41/08
[52] U.S. Cl. ........................... 222/590; 222/606; 264/28; 266/286
[58] Field of Search .................... 222/590, 591, 222/606, 607, 600; 264/28; 266/280, 286

[56] References Cited

U.S. PATENT DOCUMENTS

| | | | |
|---|---|---|---|
| 3,177,161 | 4/1965 | Johannsen | 252/502 |
| 3,512,571 | 5/1970 | Phelps | 164/37 |
| 3,757,850 | 9/1973 | Diez | 164/309 |
| 3,816,572 | 6/1974 | Roelofs | 264/28 |
| 3,885,005 | 5/1975 | Downing | 264/28 |
| 4,007,036 | 2/1977 | Gottschol | 75/68 |
| 4,061,182 | 12/1977 | Diez | 164/309 |
| 4,103,734 | 8/1978 | Mikotin | 164/309 |
| 4,153,100 | 5/1979 | Balevski | 164/155 |
| 4,246,209 | 1/1981 | Johannsen | 264/28 |
| 4,345,743 | 8/1982 | Sivilotti | 266/44 |
| 4,369,151 | 1/1983 | Johanssen | 264/28 |
| 4,428,895 | 1/1984 | Blasch | 264/28 |
| 4,508,159 | 4/1985 | Woltmann | 164/306 |
| 4,552,800 | 11/1985 | Blasch | 428/212 |
| 4,569,920 | 2/1986 | Johannsen | 501/1 |
| 4,963,396 | 10/1990 | Ito | 427/294 |
| 5,202,150 | 4/1993 | Benson | 427/595 |
| 5,269,364 | 12/1993 | Murata | 164/309 |
| 5,429,174 | 7/1995 | Wahnsiedler | 164/113 |
| 5,460,854 | 10/1995 | Krug | 427/393.6 |

FOREIGN PATENT DOCUMENTS

| | | |
|---|---|---|
| 086 501 | 6/1996 | European Pat. Off. . |
| 086 500 | 8/1996 | European Pat. Off. . |
| 2 249 784 | 11/1991 | United Kingdom . |

*Primary Examiner*—Scott Kastler
*Attorney, Agent, or Firm*—Wall Marjama Bilinski & Burr

[57] ABSTRACT

A riser tube for transfer of molten metal therethrough, including a porous ceramic substrate having a hollow cylindrical structure and ceramic impregnant material penetrating into pores of the substrate and plugging at least a portion of the surface pores thereof, to improve gas impermeability of the substrate. According to the present invention, the porous ceramic substrate is immersed in impregnation media containing ceramic particles, the impregnation media is subjected to an elevated pressure such that the media penetrates the pores of the substrate, and the impregnated substrate is then fired, whereby the ceramic particles form a ceramic impregnant material that plugs at least a portion of the surface pores of the substrate.

17 Claims, 4 Drawing Sheets

IMPREGNATED CERAMIC RISER TUBE AND METHOD OF MANUFACTURING SAME

BACKGROUND OF THE INVENTION

In metal casting industries, including aluminum casting, low pressure die casting is frequently performed, including a technique known as "Low Pressure Permanent Mold" (LPPM) processing. As shown in FIG. 1, this process uses what are called riser tubes 10 as a conduit for the molten metal 4 to pass from the melt chamber 1 to the mold cavity 2a of mold 2. The mold 2 sits atop the melt chamber and is fastened to the top of the riser tube 10 which extends downward into the bath of molten metal 4. Because the molten metal 4 is forced to rise up the core of the tube, these tubes are also referred to as "stalks". A sectional drawing of a typical riser tube is shown in FIG. 2. The casting operation is achieved by applying a positive gas pressure, usually 10 to 30 psi., to the surface of the bath of molten metal. The pressure forces metal into and up the length of the riser tube and into the mold cavity. The tube must be nearly gas-tight for two reasons:

1) to prohibit gas from becoming entrained in the molten metal (caused by the Venturi effect where gas is siphoned into the tube through the tube wall by the motion of the molten metal), resulting in gas voids in the finished metal casting, and
2) to maintain a positive pressure differential between the outside of the tube (inside the melt chamber) and the inside of the tube.

It is this pressure differential that causes the molten metal to rise up the tube into the mold cavity. Upon filling the cavity, the molten metal is allowed to solidify in the mold and form the casting. The pressure is subsequently released and the molten metal remaining in the stalk is allowed to back-flow out of the tube, draining back into the melt.

Thus, the desired properties of a riser tube used in this application include the following:

1) near impermeability to air at application temperature so that the applied pressure acts on the molten metal and does not take the "path of least resistance" through the tube;
2) non-reactivity with the molten metal being cast, to yield high purity metal castings and to enhance life of the riser tube;
3) controlled thermal conduction and insulation so that as the metal is cast into the mold and allowed to solidify, the tube allows the metal to remain in a molten state which allows back-flow and drainage of the tube; and
4) controlled mechanical properties so that as pressure is applied to the tube/mold cavity interface to ensure a tight enough seal (to prevent molten metal leakage), the tube is not damaged and can therefore be used again.

Traditional riser tubes are currently formed by machining metal blanks into the desired geometry, or forming ceramic tubes (e.g.: silicon nitride, SiAlON, aluminum titanate, fused silica) using modern conventional processing techniques. The metal riser tubes that have been functionally utilized for many years ensure gas impermeability. These metal tubes can be made of a variety of materials including basics like iron or steel, or exotics such as titanium alloys. Iron or steel riser tubes tend to contaminate molten metals such as aluminum via alloying, and likewise may yield lower quality metal castings. In fact, as an additional maintenance step, many die casting end-users coat these iron/steel tubes after each change-out in an attempt to curtail finished metal casting contamination. Titanium or other exotic metal alloy tubes may not be reactive with molten aluminum, but are quite expensive.

Fused silica ceramic riser tubes are frequently used, but lack mechanical strength to survive typical handling techniques in a casting facility. In the case of molten aluminum, silica is reactive with this metal, and hence, the molten metal may pick-up contamination and the life of the tube is shortened. Also, these fused silica tubes are typically gas permeable thus providing sub-optimal stalk performance and metal casting quality. The currently used more exotic ceramic riser tubes such as silicon nitride, SiAlON, and aluminum titanate are generally inherently nearly gas impermeable, but are also expensive due to high raw material and processing costs.

Typically, low pressure die casting systems are utilized a high proportion of available time, and thus require regular maintenance and monitoring. Commonly, at some time interval (or number of cycles interval), riser tubes are removed from the die casting apparatus, allowed to cool, cleaned (molten metal peeled off), and then are reinstalled. In some cases, including with fused silica ceramic and iron/steel metal, they are also sometimes coated in some manner before reinstallation. Frequent handling of this nature necessitates a riser tube material with a reasonable degree of mechanical strength. Exotic alloys and composites provide adequate thermal properties but lack the mechanical strength to survive simple mishandling such as an accidental minor hit against a building wall, etc.

Thus, consideration was given to utilize a riser tube material of appropriate thermal conductivity to maintain the metal in a molten state, and also to have reasonable mechanical properties to survive the necessary rigors of normal industrial use. There are some ceramic materials that can fulfill those requirements. However, there are no known economical ceramic materials that are also nearly gas impermeable, which is a key characteristic in this application, as has been explained.

SUMMARY OF THE INVENTION

Briefly stated, according to the present invention, a porous ceramic tube substrate is first formed or obtained, followed by treatment with a specially developed impregnation method to provide a novel ceramic riser tube that is nearly gas impermeable. This tube is used as a stalk in low pressure die casting equipment for the casting of aluminum and other metal components.

According to the present invention, the ceramic riser tube is a better insulator (lower thermal conductivity) than a metal riser tube, so the molten metal remains hotter within the ceramic tube resulting in less likelihood of a "freeze-up" (metal solidification) in the tube, and enabling back-flow drainage of the molten metal from the tube back to the furnace melt. The lower cost of an impregnated ceramic riser tube is an advantage compared to more costly silicon nitride, SiAlON, and aluminum titanate ceramic riser tubes, as well as non-reactive high temperature capability metal alloy riser tubes.

Various ceramic forming methods can be used to make the porous ceramic tube substrate, including the freeze-casting method described in U.S. Pat. No. 4,246,209, which is hereby incorporated by reference. According to this method, aqueous slurries containing inorganic colloidal sol and inorganic ceramic particles are injected or cast into a single mold, frozen, and then demolded to form a ceramic component in this case, a porous ceramic substrate tube. This tube is then dried and fired using standard methods.

The porous ceramic substrate tube can be made of a variety of ceramic compositions, including but not limited to: alumina, mullite, cordierite, silicon carbide, silica, silicon nitride, aluminum nitride, magnesia, alumina-magnesia spinel, aluminum titanate, zircon, zirconia, clays, and any combinations thereof.

The ceramic tube substrate is then further processed with an impregnation method according to the present invention to make the tube nearly gas impermeable. In this method, the ceramic tube is first immersed into a pressure tight vessel containing inorganic colloidal sol or inorganic particle suspension, then vacuum is applied followed by a gas pressure application. Following the impregnation, the tube is then dried and fired again.

The final tube structure has significantly reduced surface porosity in air at room temperature and virtually no interconnected pores on the surface at application temperature (1300–1500° F.). The present method can be used with freeze-cast formed ceramics or any other ceramic, as long as the pore sizes of the substrate are larger than the particle sizes of the solids in the inorganic colloidal sol or inorganic particle suspension impregnant. Because this impregnation method can be used with a variety of different ceramic substrate materials, it provides the flexibility to produce finished impregnated ceramic tubes that have the specific ceramic properties desirable for the application and end-user.

DETAILED DESCRIPTION OF PREFERRED EMBODIMENTS

The scope of the invention is further described in connection with the following examples which are set forth for purposes of illustration only and are not to be construed as limiting the scope of the invention in any matter.

A single procedure was followed for each tube manufactured. First, a ceramic riser tube substrate was processed using the method of U.S. Pat. No. 4,246,209. Following forming, each tube was dried at temperature of around 200° F. for about 4 to 8 hours, although this specific drying temperature and schedule is not critical. Subsequently, each tube was fired to the temperature prescribed for that specific ceramic material. It is noted that the pore size distributions of the different fired ceramic tube substrates were approximately the same, as was the appearance of the surface of the tubes. Each ceramic substrate tube formed had a nominal median pore size of approximately 5 microns. It should be noted that, in order to make tubes that are resistant to reaction with molten aluminum, a non-wetting agent (as known in the art, such as commercially available barium sulfate) was included as part of the ceramic tube substrate raw material batch prior to forming.

Figure 1:
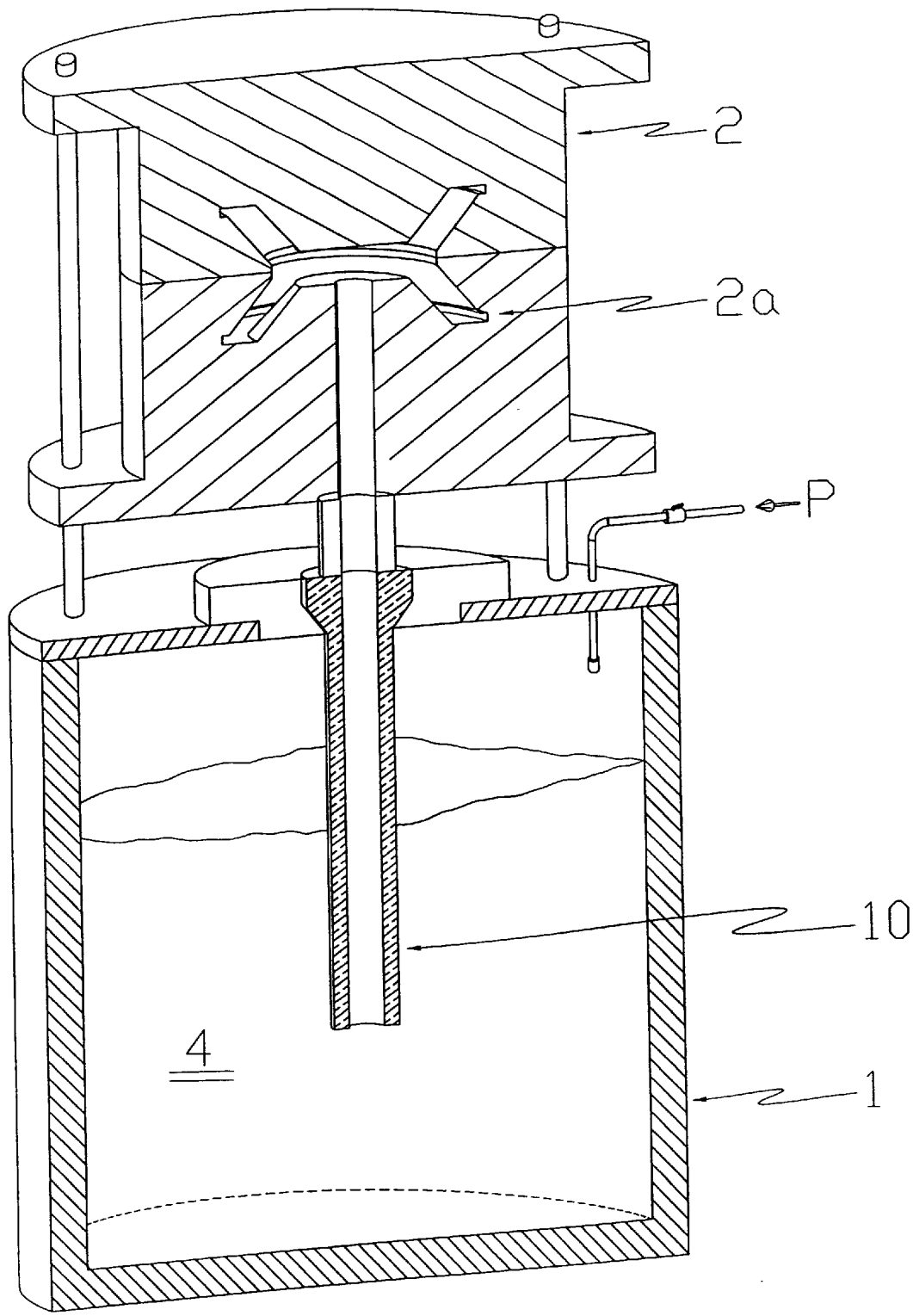
FIG. 1 is a cross-sectional view of a low pressure die casting apparatus.
Figure 2:
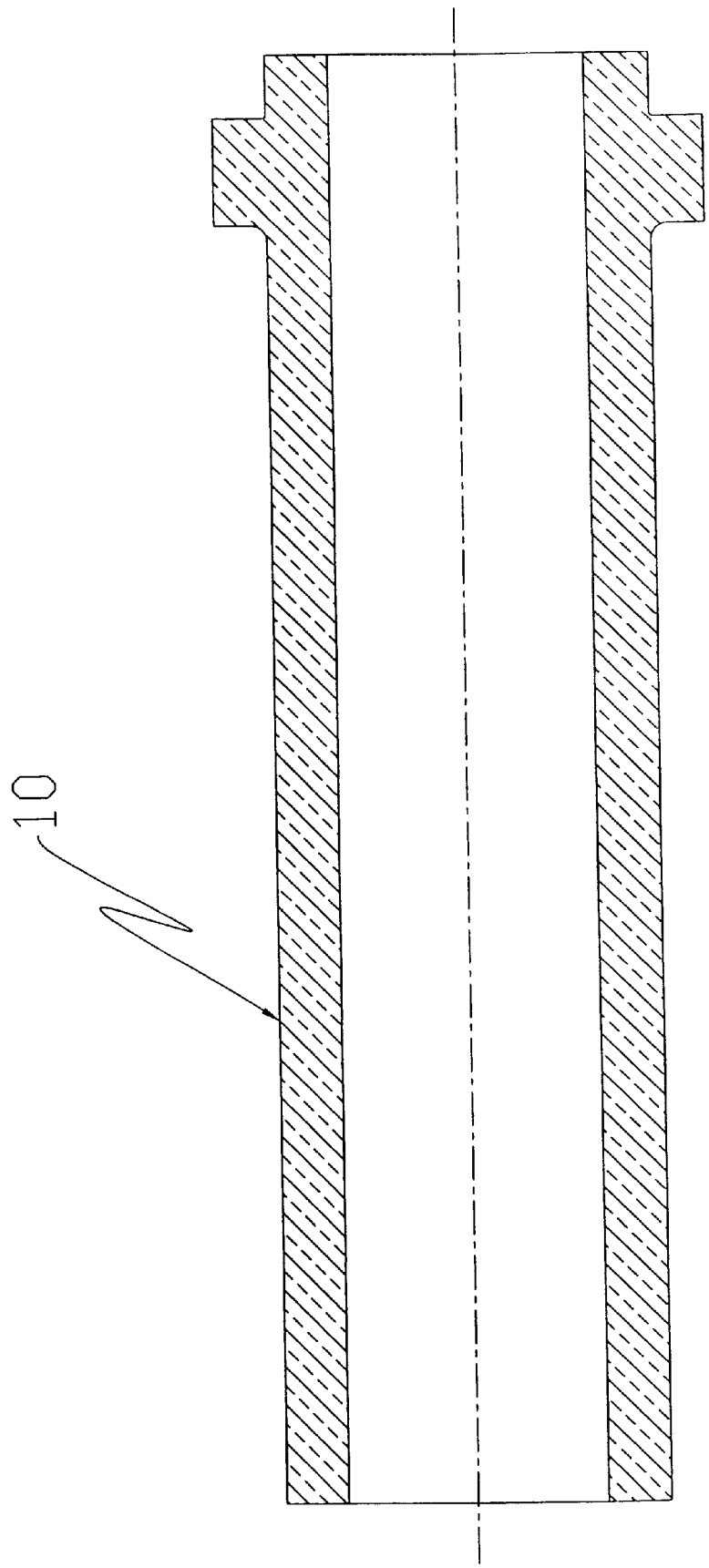
FIG. 2 is a cross-sectional view showing the contour of a riser tube according to the present invention.
Figure 3:
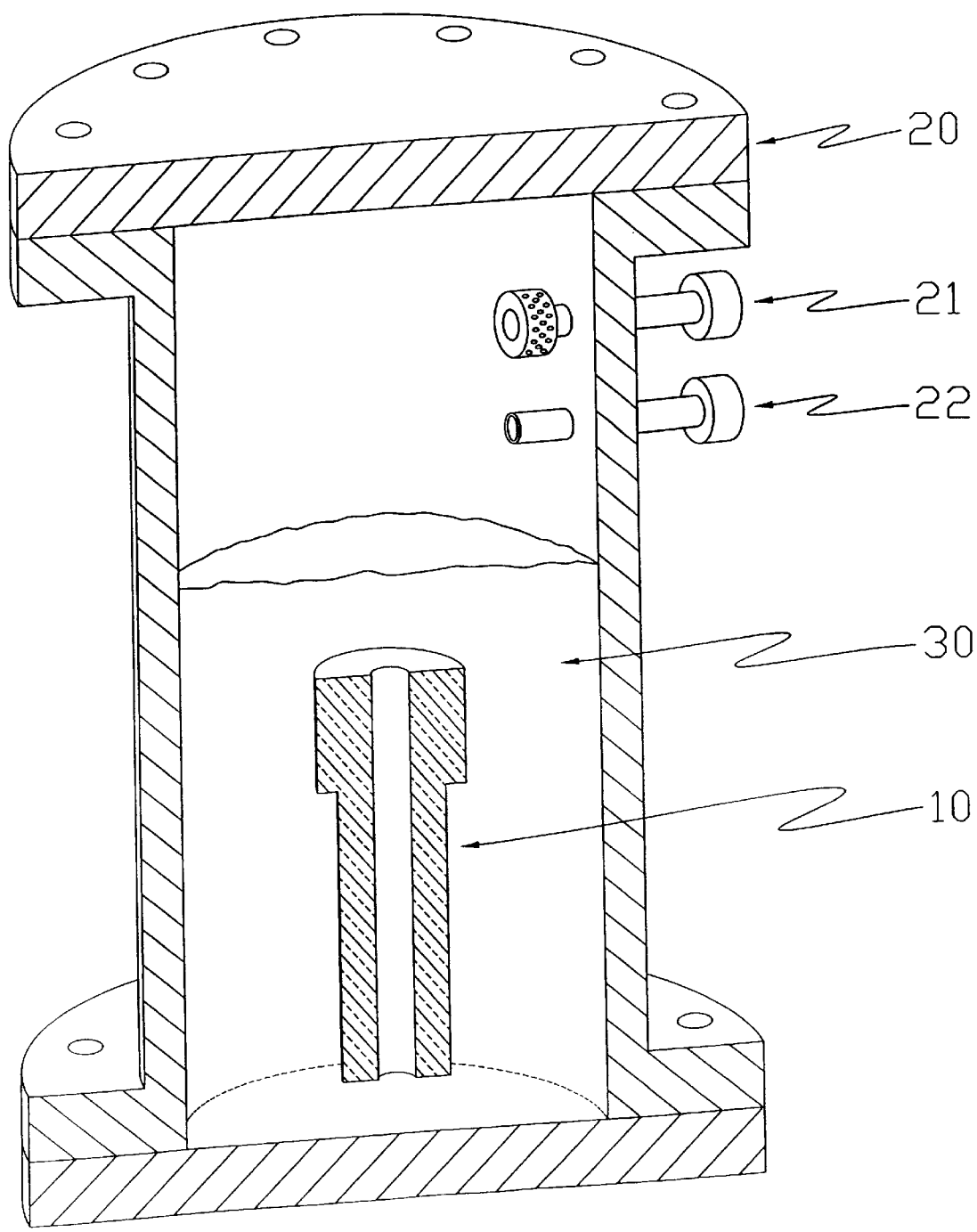
FIG. 3 illustrates an apparatus for impregnating a porous riser tube according to the present invention.

Following the forming and firing of the ceramic substrate tubes, each ceramic tube 10 was then immersed in a bath of impregnation media 30 in an air-tight pressure chamber 20, as shown in FIG. 3. After sealing the chamber 20, chamber 20 was evacuated by application of a vacuum through vacuum fitting 21. The vacuum was held to evacuate as much of the air as possible from the pore network of the substrate. Upon sufficient evacuation, air pressure was applied through pressure fitting 22 to the liquid (and substrate) for a specific time period to force the impregnation media (liquid and particle) into the substrate's pores. The wet impregnated tube was removed from the chamber, dried in air at room temperature, and re-fired as prescribed earlier.

Figure 4:
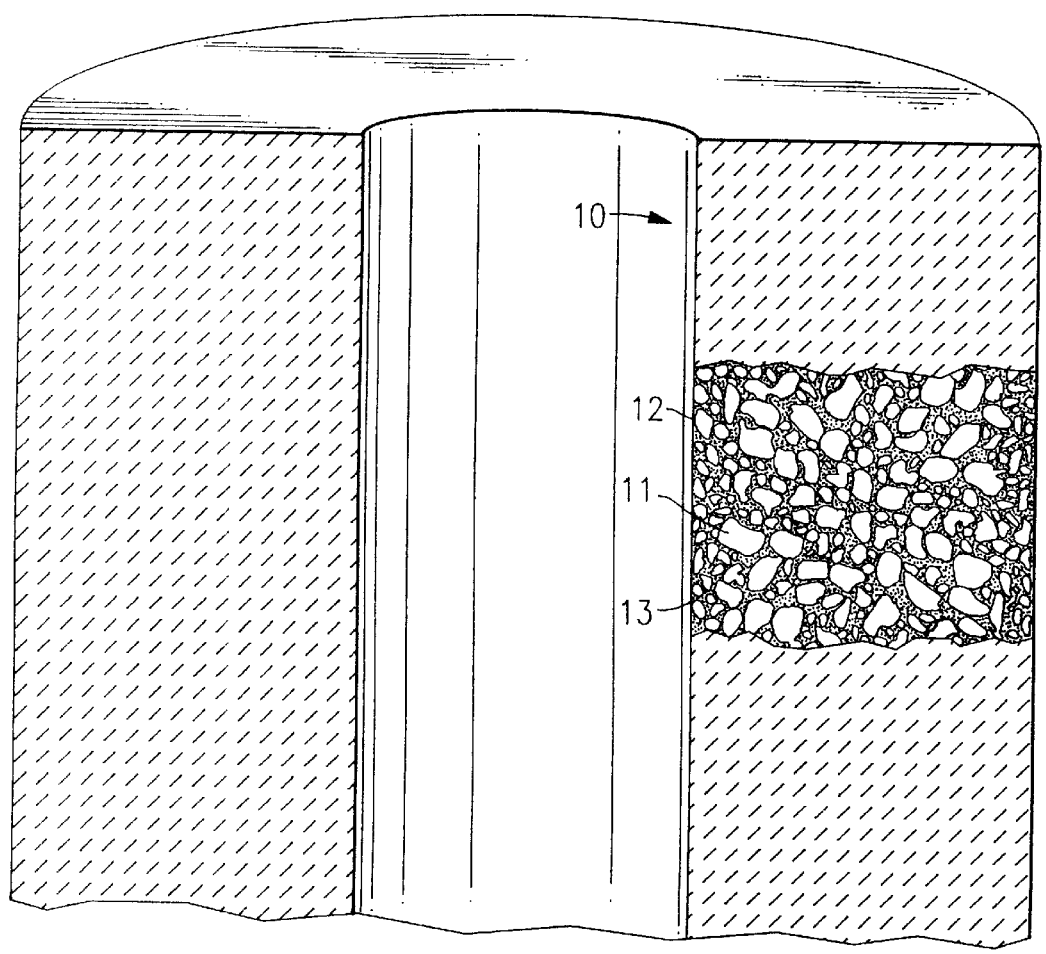
FIG. 4 illustrates a partial cross-sectional view showing the relative degree of impregnation according to the present invention.

The final structure of the impregnated tube is believed to correspond with the partial cross-section shown in FIG. 4, although no SEM analysis was done to provide a precise illustration. As shown, the riser tube 10 is made up of ceramic particles 11 of various sizes. The particles are three-dimensionally bonded together and define a three-dimensional porous structure. The outer pores 12 are plugged or substantially sealed by ceramic impregnation material 13 provided by firing of the impregnation media 30. It is estimated that the ceramic impregnant material penetrated the tube 10 on the order of 0.1 to 1.0 mm in depth. The present invention thus provides a substantially impermeable riser tube that can support an inside/outside pressure differential over a minimum time period as described hereinbelow.

The impregnated tube was then subjected to a pressure-drop test at room temperature to determine the level of impermeability to gas. In the test, the tube is sealed at both ends (using a clamping device and rubber gaskets), with an air intake fitting installed to one of these ends such that an air line can be attached to it. Regulated low pressure air is pumped into the sealed tube through the air fitting, such that the tube is pressurized to 6 psi. After this 6 psi pressurization, the air intake line to the sealed tube is shut-off and the pressure is allowed to drop to 3 psi. The time for this pressure reduction (from 6 psi to 3 psi) determines the acceptability of the tube. Based on input from an end-user of riser tubes (e. g., an aluminum low-pressure die caster) regarding one particular riser tube design, a minimum time in seconds was designated (which varies for each material composition and riser tube configuration) for this pressure reduction to occur. This is done as a means to determine whether the tube would work successfully in application. Tubes that take longer than the specified minimum time to drop from 6 psi to 3 psi of air pressure were deemed better (less gas permeable) than those that took less than the specified minimum time (more gas permeable).

Further, because of the pore network of the substrates formed using the present process, a particular impregnation media was used. A colloidal silica sol, an aqueous dispersion of approximately 30% concentration of 7 nanometers nominal average size silica particles was utilized. The freeze-cast ceramic tube substrate would easily accept particles of this size into the nominal median 5 micron size pores.

It was found that although prior art fused silica riser tubes reacted with molten aluminum, the embodiments herein did not appear to do so. It is believed that the pore network structure of the substrate together with the non-wetting agent protected the otherwise reactive silica from the molten aluminum. While the ceramic substrate tubes used in the examples in this invention were formed by the freeze-casting method, porous ceramic substrates formed by other processes and made of other compositions than those mentioned herein would also perform satisfactorily. Further, while inorganic silica sol was used in this case, other types of inorganic colloidal sols and inorganic particulate suspensions would also work satisfactorily in the present invention.

It is particularly important in the present invention, however, that the solids in the sol or suspension have an average particle size that is lower than the ceramic substrate's average pore size.

EXAMPLE 1

Impregnation of Ceramic Substrate Tube of Alumina/Silicon Carbide Composite

A ceramic tube substrate was formed using the freeze-casting method of U.S. Pat. No. 4,246,209 and fired. The composition of the ceramic tube substrate in this example was nominally as follows:

82% alumina

9% silicon carbide

4% silica

5% aluminum non-wetting agent and traces of other components

The approximate outside dimensions of this formed tube were 7.8" long×3.3" outside diameter (with wall thicknesses ranging from 0.5" to 1" along the length of the tube). The ceramic tube substrate was immersed in a bath of silica sol and evacuated to 25 inches Hg for a period of 5 minutes. After shutting off the evacuation, pressure was applied using compressed air to a level of 150 psi for a period of 5 minutes. After shutting off the pressure and venting the chamber, the tube was removed, allowed to air dry at room temperature for 16 hours or longer, and fired to the usual prescribed temperature of 1832° F. with a 1 hour hold. The cross-section of a fired, sliced impregnated ceramic riser tube microscopically showed that the impregnant penetrated and plugged surface pores of the ceramic substrate.

The ceramic tube substrate before impregnation had an apparent porosity of 15–20%, which was a factor in permitting impregnation to occur. The ceramic substrate before impregnation had a room temperature flexural strength (3 point modulus of rupture) of 4,300 psi nominally, and this was virtually unaffected by impregnation. The weight of an unimpregnated fired tube substrate was 3096.12 gm, and, after impregnation, drying and refiring, increased to 3173.41 gm (+77.29 g): a weight gain of 2.50%. Upon pressure testing of this impregnated riser tube, 13.3 seconds time was required to relieve the tube from 6 psi to 3 psi pressure, thereby providing acceptable results. Repeating the impregnation, drying, and refiring steps a second time resulted in further increases in weight gain and pressure loss time. Other impregnated tubes were subsequently processed in the same manner, with the same composition, etc., and the pressure testing relief times ranged from 9 to 15 seconds: all acceptable based upon the 8 second minimum time specified by an end-user in the aluminum die casting industry.

EXAMPLE 2

Impregnation of Ceramic Substrate Tube of Alumina/Silicon Carbide Composite

A ceramic tube substrate was formed using the freeze-casting method of U.S. Pat. No. 4,246,209 and fired. The composition of the ceramic tube substrate in this example was nominally as follows:

82% alumina

9% silicon carbide

4% silica

5% aluminum non-wetting agent and traces of other components

The approximate outside dimensions of this formed tube were 7.8" long×3.3" outside diameter (with wall thicknesses ranging from 0.5" to 1" along the length of the tube). The ceramic tube substrate was immersed in a bath of silica sol and evacuated to 20 inches Hg for a period of 20 minutes. After shutting off the evacuation, pressure was applied using compressed air to a level of 100 psi for a period of 20 minutes. After shutting off the pressure and venting the chamber, the tube was removed, allowed to air dry at room temperature for 16 hours or longer, and fired to the usual prescribed temperature of 1832° F. with a 1 hour hold. The cross-section of a fired, sliced impregnated ceramic riser tube microscopically showed that the impregnant penetrated and plugged surface pores of the ceramic substrate. The ceramic tube substrate before impregnation had an apparent porosity of 15–20%, which was a factor in permitting impregnation to occur. The ceramic substrate before impregnation had a room temperature flexural strength (3 point modulus of rupture) of 4,300 psi nominally, and this was virtually unaffected by impregnation.

The following data were measured from five samples made in accordance with the process of Example 2 discussed above.

|  | Unimpregnated Tube | Impregnated Tube |
| --- | --- | --- |
| Avg. Pressure Drop (st. dev.) | 5.75 sec (0.23) | 13.38 sec (1.01) |
| Avg. Weight (st. dev.) | 3069.70 gm (10.54) | 3152.28 (9.80) |

As shown above, the pressure drop time increased significantly, well above the 8 sec minimum specified by the end user for these particular samples. In addition, the samples increased in weight by about 2.7%.

The samples were then impregnated a second time under the same conditions noted above. The samples were found to have an average weight of 3199 gm (st. dev. 11.24) and an average pressure drop of 19.75 sec (st. dev. 1.15). Thus, it is quite clear that additional impregnation steps can further increase impermeability

EXAMPLE 3

Impregnation of Ceramic Substrate Tube of Fused Silica

A ceramic tube substrate was formed using the freeze-casting technology described in U.S. Pat. No. 4,246,209 and fired. The composition of the ceramic tube substrate in this example was nominally as follows:

86.5% silica 8.5% alumina

5% aluminum non-wetting agent and traces of other components

The approximate outside dimensions of this formed tube were 7.8" long×3.3" outside diameter (with wall thicknesses ranging from 0.5" to 1" along the length of the tube). The ceramic tube substrate was immersed in a bath of silica sol and evacuated to 20 inches Hg for a period of 20 minutes. After shutting off the evacuation, pressure was applied using compressed air to a level of 100 psi for a period of 20 minutes. After shutting off the pressure and venting the chamber, the tube was removed, allowed to air dry at room temperature for 16 hours or longer, and fired to the usual prescribed temperature of 1832° F. with a 1 hour hold. The cross-section of a fired, sliced impregnated ceramic riser tube microscopically showed that the impregnant penetrated and plugged surface pores of the ceramic substrate.

The ceramic tube substrate before impregnation had apparent porosity of 24–28%, which was a factor in permitting impregnation to occur. The ceramic substrate before impregnation had a room temperature flexural strength (3 point modulus of rupture) of 1,700 psi nominally, and this was virtually unaffected by impregnation. The weight of an unimpregnated fired tube substrate was 1870.64 gm, and, after impregnation, drying and refiring, increased to 1956.28 gm (+85.64 g): a weight gain of 4.58%. Upon pressure testing of the impregnated riser tube, 4.0 seconds time was required to relieve the tube from 6 psi to 3 psi, thereby providing acceptable results. Three seconds was established as the minimum for this composition and tube configuration, based upon specifications and feedback from an end-user of such riser tubes.

While preferred embodiments have been described herein in particular detail, modifications thereto may be made without departing from the spirit of the present invention and still fall within the scope of the present claims.

We claim:

1. A riser tube for transfer of molten metal, comprising:
   a porous ceramic substrate having pores including surface pores, said substrate having a hollow cylindrical structure; and
   ceramic impregnant material penetrating into pores of the substrate and plugging at least a portion of the surface pores of the substrate, thereby improving gas impermeability of the substrate.

2. The riser tube of claim 1, wherein said substrate is formed by freeze-casting.

3. The riser tube of claim 1, wherein said substrate comprises at least one material from the group consisting of alumina and silica.

4. The riser tube of claim 1, wherein said substrate comprises at least one material selected from the group consisting of alumina, mullite, cordierite, silicon carbide, silica, silicon nitride, aluminum nitride, magnesia, alumina-magnesia spinel, aluminum titanate, zircon, zirconia, clays, and any combinations thereof.

5. The riser tube of claim 1, wherein said ceramic impregnant material comprises silica.

6. The riser tube of claim 1, wherein said ceramic impregnant material is formed by impregnating the substrate under elevated pressure with a sol or slurry containing ceramic particles, and heating the impregnated substrate.

7. The riser tube of claim 6, wherein said ceramic particles have an average particle size that is smaller than an average pore size of the substrate.

8. The riser tube of claim 1, wherein said substrate has a three-dimensional porous network.

9. A method for forming a riser tube, comprising;
   immersing a porous ceramic substrate in impregnation media containing ceramic particles, said substrate having a hollow cylindrical structure and having pores including surface pores;
   subjecting the impregnation media to an elevated pressure such that the impregnation media penetrates the pores of the substrate; and
   heating the impregnated substrate, whereby the ceramic particles form a ceramic impregnant material that plugs at least a portion of the surface pores of the substrate.

10. The method of claim 9, further comprising providing said substrate by firing a green ceramic body formed by freeze casting.

11. The method of claim 9, wherein said impregnation media is provided in a chamber, said chamber being evacuated prior to application of said elevated pressure.

12. The method of claim 9, wherein said impregnation media comprises a sol or a slurry containing said ceramic particles.

13. The method of claim 12, wherein said ceramic particles comprise colloidal silica.

14. The method of claim 9, wherein said ceramic particles have an average size that is smaller than an average pore size of the substrate.

15. The method of claim 9, wherein said substrate comprises at least one material from the group consisting of alumina and silica.

16. The method of claim 9, wherein said substrate comprises at least one material selected from the group consisting of alumina, mullite, cordierite, silicon carbide, silica, silicon nitride, aluminum nitride, magnesia, alumina-magnesia spinel, aluminum titanate, zircon, zirconia, clays, and any combinations thereof.

17. The method of claim 9, wherein said substrate has a three-dimensional porous network.

* * * * *